(12) United States Patent
Krasnopolskiy et al.

(10) Patent No.: US 11,547,245 B2
(45) Date of Patent: Jan. 10, 2023

(54) GRINDING APPARATUS AND METHOD

(71) Applicants: Vadim Krasnopolskiy, East Brunswick, NJ (US); German Shestakov, East Brunswick, NJ (US)

(72) Inventors: Vadim Krasnopolskiy, East Brunswick, NJ (US); German Shestakov, East Brunswick, NJ (US)

( * ) Notice: Subject to any disclaimer, the term of this patent is extended or adjusted under 35 U.S.C. 154(b) by 281 days.

(21) Appl. No.: 17/036,727

(22) Filed: Sep. 29, 2020

(65) Prior Publication Data

US 2021/0127901 A1    May 6, 2021

Related U.S. Application Data

(60) Provisional application No. 62/930,032, filed on Nov. 4, 2019.

(51) Int. Cl.
*A47J 42/24* (2006.01)
*A24B 7/04* (2006.01)
*A24C 5/24* (2006.01)
*A47J 42/50* (2006.01)
*A24C 5/42* (2006.01)

(52) U.S. Cl.
CPC ............. *A47J 42/24* (2013.01); *A24B 7/04* (2013.01); *A24C 5/42* (2013.01); *A47J 42/50* (2013.01)

(58) Field of Classification Search
CPC .. A47J 42/24; A47J 42/38; A47J 42/50; A47J 42/40; A47J 42/22; A47J 42/26; A24B 7/04; A24C 5/42
See application file for complete search history.

(56) References Cited

U.S. PATENT DOCUMENTS

| | | |
|---|---|---|
| D273,365 S | 4/1984 | Lukins |
| D281,054 S | 10/1985 | Menrad |
| D285,732 S | 9/1986 | Holloway |
| D287,339 S | 12/1986 | Dominski |
| D295,482 S | 5/1988 | Bunge |
| D302,873 S | 8/1989 | Sayn Wittgenstein |
| 5,000,601 A | 3/1991 | Wruck |
| 6,405,951 B1 | 6/2002 | Wu |
| D545,147 S | 6/2007 | Marshall |
| D553,450 S | 10/2007 | Sorensen |
| D662,827 S | 7/2012 | Watabe |

(Continued)

FOREIGN PATENT DOCUMENTS

CN         305043016         2/2019

*Primary Examiner* — Shelley M Self
*Assistant Examiner* — Mohammed S. Alawadi
(74) *Attorney, Agent, or Firm* — Walter J. Tencza, Jr.

(57) ABSTRACT

An apparatus including a grinder lid section; a grinder section configured to be attached to and detached from the grinder lid section, so that when the grinder section is attached to the grinder lid section the grinder lid section rotates with respect to the grinder section; a funnel section configured to be attached to and detached from the grinder section, so that when the funnel section is attached to the grinder section the funnel section does not rotate with respect to the grinder section; and a storage section configured to be attached and detached from the funnel section, so that when the storage section is attached to the funnel section the storage section does not rotate with respect to the funnel section. Each of the grinder lid section and the grinder section has a plurality of pointed teeth which face towards each other.

20 Claims, 18 Drawing Sheets

(56) References Cited

U.S. PATENT DOCUMENTS

| | | |
|---|---|---|
| D695,627 S | 12/2013 | Chen |
| D717,653 S | 11/2014 | Chur |
| D760,087 S | 6/2016 | Dittmer |
| 9,427,020 B2 | 8/2016 | Ruzycky |
| 9,873,125 B1 | 1/2018 | LaGuardia, Jr. |
| D846,197 S | 4/2019 | Apodaca |
| D846,995 S | 4/2019 | El Beaini |
| D849,530 S | 5/2019 | Fremgen |
| D898,296 S | 10/2020 | Min |
| D920,578 S | 5/2021 | Min |
| D930,906 S | 9/2021 | Jung |
| 2014/0182604 A1* | 7/2014 | Hutton .................. A24C 5/42 131/108 |
| 2014/0261471 A1* | 9/2014 | Ruzycky ................ A24C 5/42 131/108 |
| 2020/0139378 A1* | 5/2020 | Migale .................. A47J 42/24 |
| 2020/0156823 A1 | 5/2020 | Hon |
| 2021/0106116 A1 | 4/2021 | Gim |
| 2021/0127901 A1 | 5/2021 | Krasnopolskiy |

* cited by examiner

GRINDING APPARATUS AND METHOD

CROSS REFERENCE TO RELATED APPLICATION(S)

This application claims the priority of U.S. provisional patent application, Ser. No. 62/930,032, filed on Nov. 4, 2019, inventor and applicants Vadim Krasnopolskiy and German Shestakov, titled "ALL-IN-ONE DEVICE USED TO GRIND, FILL AND PACK PODS FOR PERSONAL USE".

FIELD OF THE INVENTION

This invention relates to devices for grinding materials such as devices for grinding herbs.

BACKGROUND OF THE INVENTION

There are various known devices and methods for grinding herbs.

SUMMARY OF THE INVENTION

There is a need in the market for a simple and efficient product that can grind, pack, and store PODs without the use of motors, batteries or interchangeable parts. A "POD"—as used herein refers to materials such as loose rolling paper, cylindrical-shaped pre-rolled rolling papers, cone-shaped pre-rolled rolling papers, tobacco leaf, fastpacks, cones, cigarette tubes, blunt wrap, and other similar products.

In at least one embodiment, the present invention provides an all-in-one portable device designed to grind coarse content to a desired consistency and fill/pack ground content directly into POD without the need for interchangeable parts, motors or batteries.

In at least one embodiment of the present invention an apparatus is provided comprising: a grinder lid section; a grinder section; a funnel section; and a storage section.

The grinder section may be configured to be attached to and detached from the grinder lid section, so that when the grinder section is attached to the grinder lid section the grinder lid section rotates with respect to the grinder section.

The funnel section may be configured to be attached to and detached from the grinder section, so that when the funnel section is attached to the grinder section the funnel section does not rotate with respect to the grinder section.

The storage section may be configured to be attached and detached from the funnel section, so that when the storage section is attached to the funnel section the storage section does not rotate with respect to the funnel section.

In at least one embodiment, the grinder lid section has a plurality of pointed teeth which face towards the grinder section when the grinder lid section is attached to the grinder section; and the grinder section has a plurality of pointed teeth which face towards the grinder lid section when the grinder lid section is attached to the grinder section.

In at least one embodiment, the funnel section includes a funnel which funnels material entering an entrance opening of the funnel section towards a first side of the funnel section and away from a second side of the funnel section, which is opposite the first side, and out an exit opening of the funnel section.

The storage section may include an elongated tube having an entrance opening. The funnel section may be adapted to be attached to the storage section to cause material to escape from the exit opening of the funnel section into the entrance opening of the elongated tube of the storage section.

In at least one embodiment, the grinder section has a plurality of openings and wherein when the grinder section is attached to the funnel section and when a plurality of particles falls through the plurality of openings, the plurality of particles falls into the entrance opening of the funnel section.

The apparatus may further include an additional section; wherein the additional section is configured to attach to either the grinder lid or the storage section, so that the additional section does not rotate with respect to the grinder lid when attached to the grinder lid and the additional section does not rotate with respect to the storage section when attached to the storage section.

In at least one embodiment of the present invention, a method is provided which includes grinding coarse content material into ground content material by rotating a grinder lid section while the grinder lid section is connected to a grinder section.

The grinder section and grinder lid section may be configured as previously described and further components may be provided and used as previously described.

The grinder section and the grinder lid section may be attached to each other by magnetic attraction.

DETAILED DESCRIPTION OF THE DRAWINGS

Figure 1:
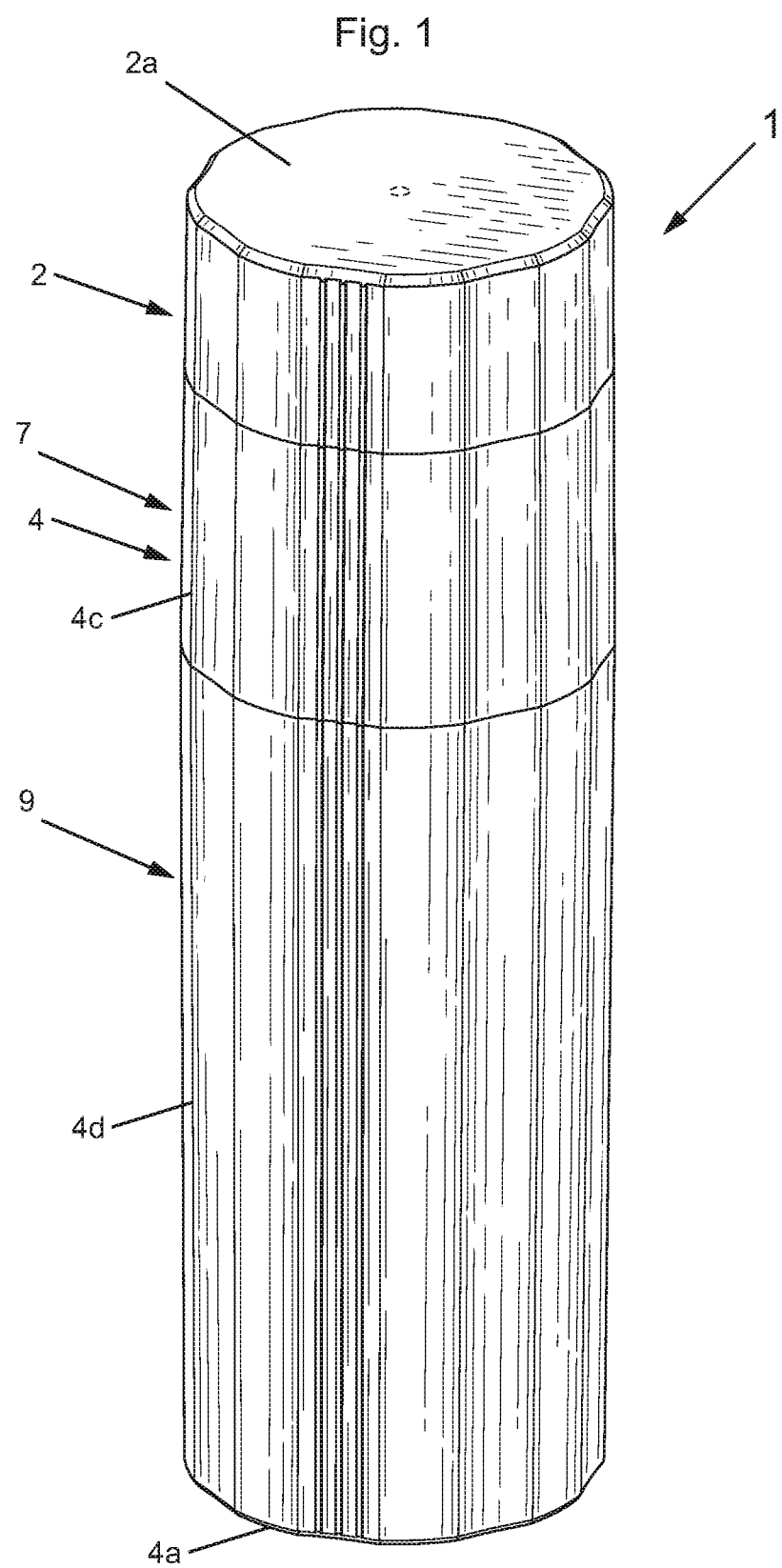
FIG. 1 is a front, and top perspective view of a grinder apparatus, with a first part and a second part connected together in an assembled state, in accordance with an embodiment of the present invention.

A "coarse content"—as used herein refers to oversized materials such as, but not limited to, herbs, tobacco, industrial hemp, and CBD (cannabidiol) flower, marijuana, which may contain seed and stems and are too large to fit in filling chamber or tube 28 and/or 128.

A "ground content"—as used herein refers to shredded materials such as, but not limited to, herbs, tobacco, industrial hemp, and CBD flower, marijuana, which may contain seed and stems and are fine enough to fit in filling chamber or tube 28 and/or tube 128.

A "filling chamber"—as used herein refers to compartment or tubes 28 and/or 128 in storage section 9 and/or 109 that holds the POD in place and positioned directly under the funnel (combination of 25b and 25c) and/or funnel 125 allowing ground content to fill and pack into the POD.

A "POD"—as used herein refers to materials such as loose rolling paper, cylindrical-shaped pre-rolled rolling papers, cone-shaped pre-rolled rolling papers, tobacco leaf, fastpacks, cones, cigarette tubes, blunt wrap, and other similar products.

FIG. 1 is a front, and top perspective view of a grinder apparatus 1, with a first part or grinder lid 2 and a second part 4 connected together in an assembled state, in accordance with an embodiment of the present invention. The second part 4 includes a grinder 5, a funnel section 7, and a storage section 9, as shown by FIG. 8.

Figure 2:
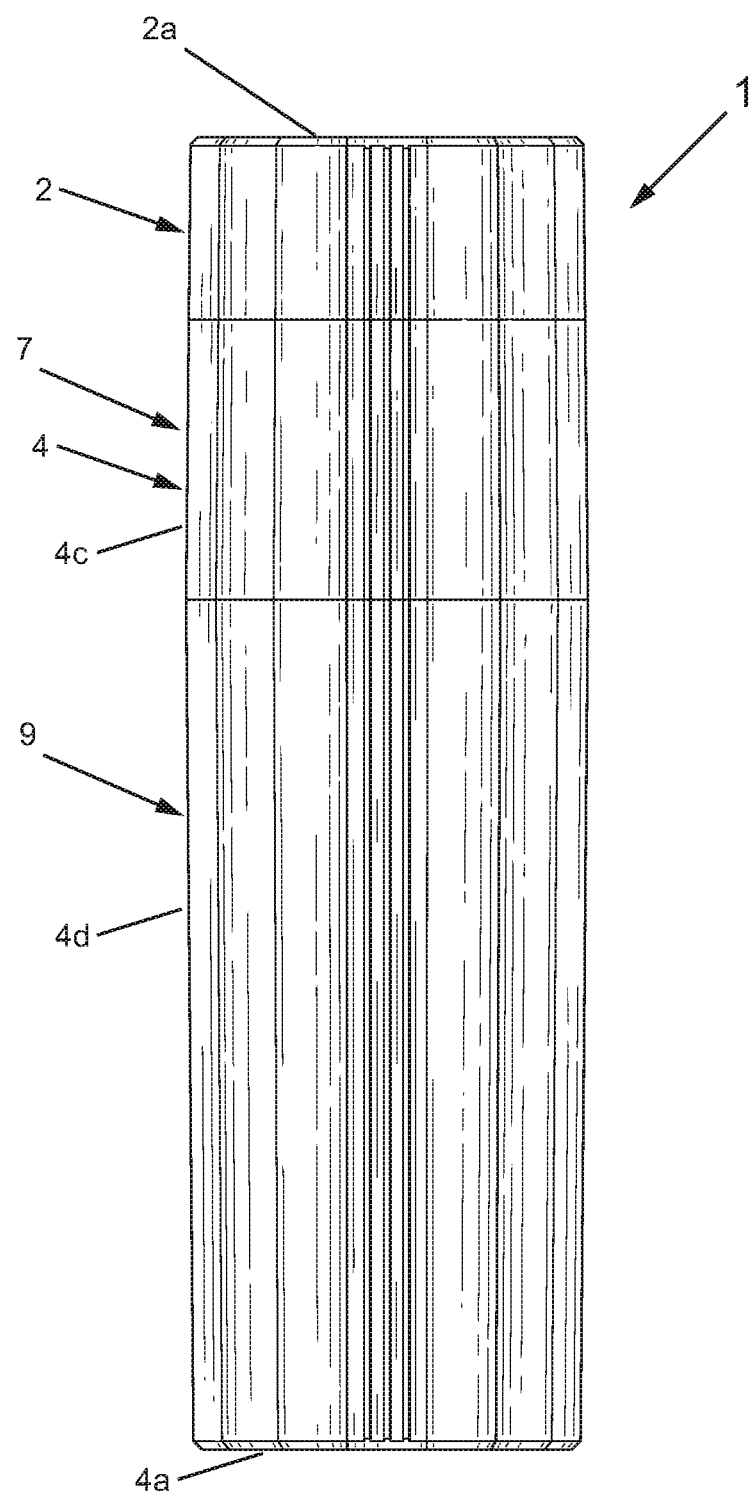
FIG. 2 is a front elevational view of the grinder apparatus of FIG. 1, in the assembled state.
Figure 3:
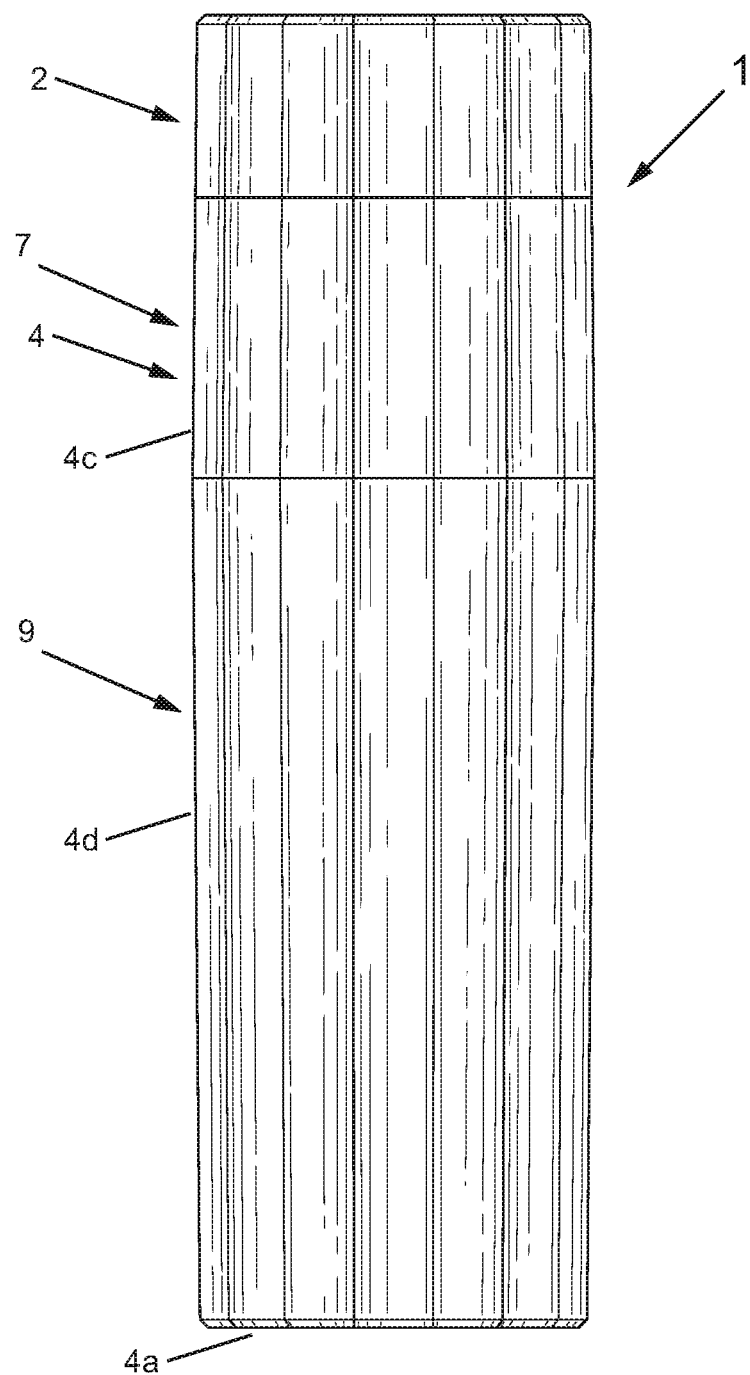
FIG. 3 is a rear elevational view of the container grinder apparatus of FIG. 1, in the assembled state.
Figure 4:
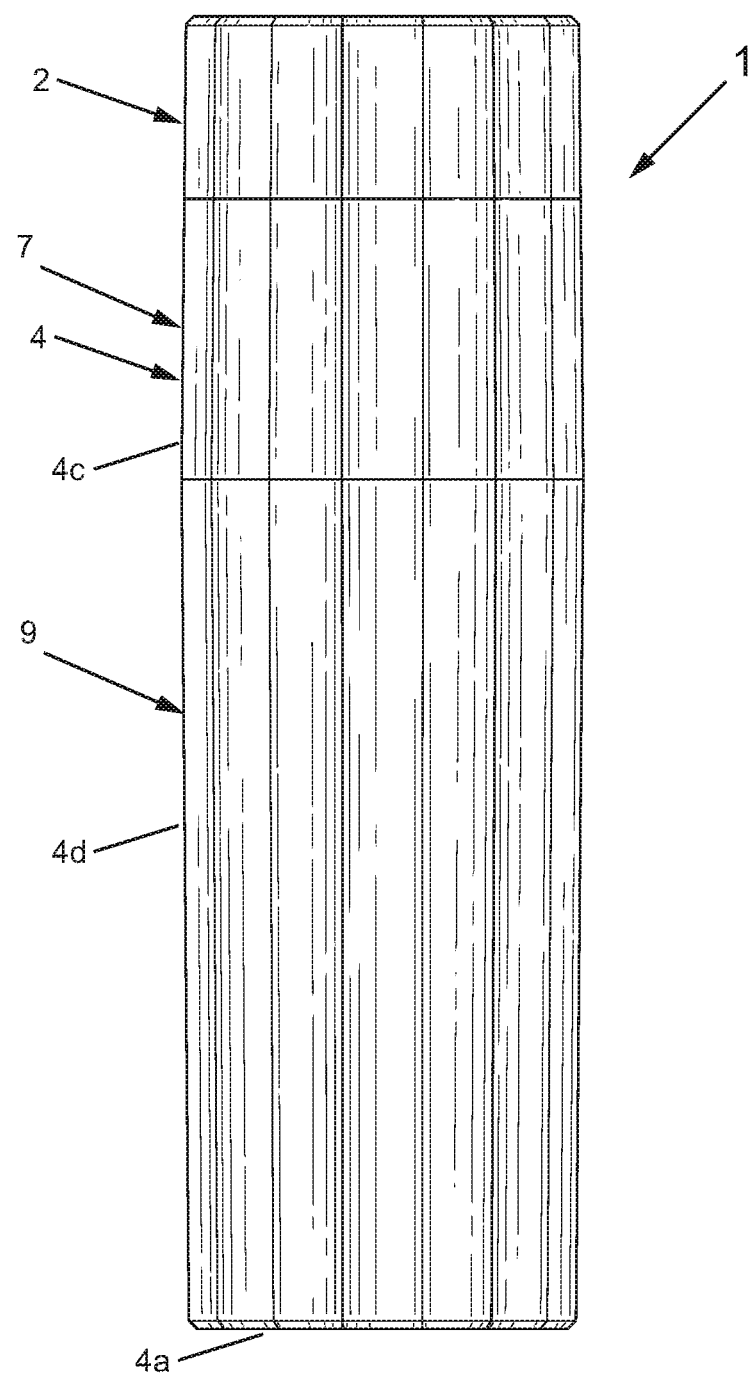
FIG. 4 is a left side elevational view of the grinder apparatus of FIG. 1, in the assembled state.
Figure 5:
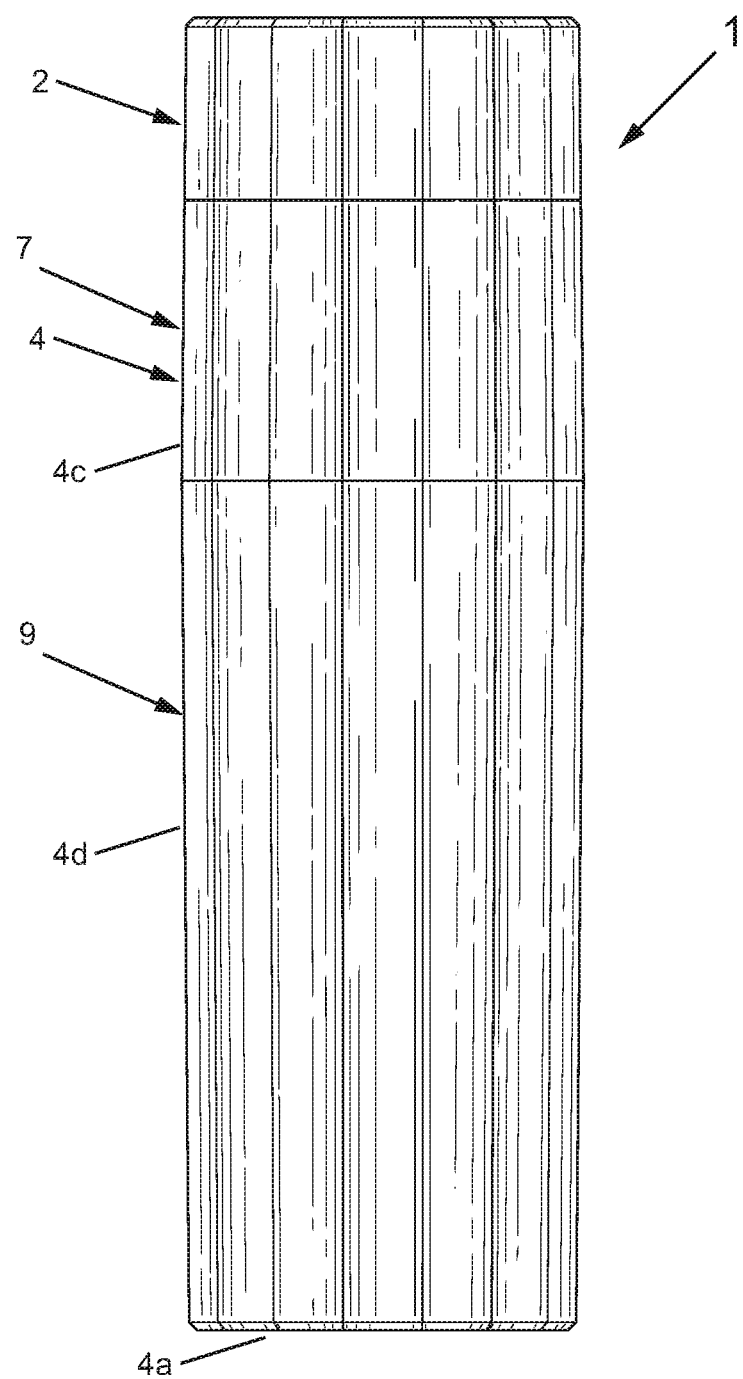
FIG. 5 is a right side elevational view of the grinder apparatus of FIG. 1, in the assembled state.
Figure 6:
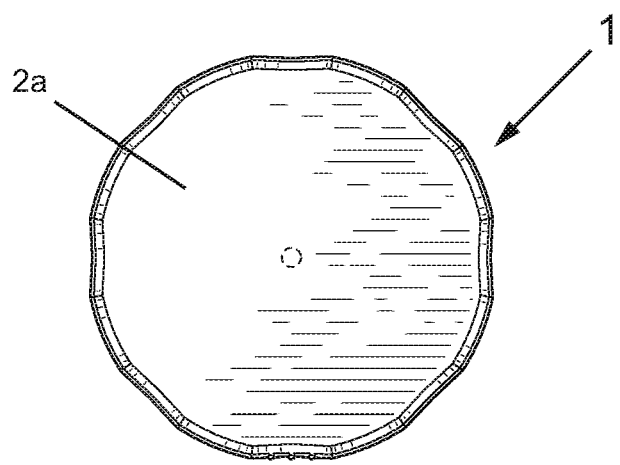
FIG. 6 is a top elevational view of the grinder apparatus of FIG. 1, in the assembled state.
Figure 7:
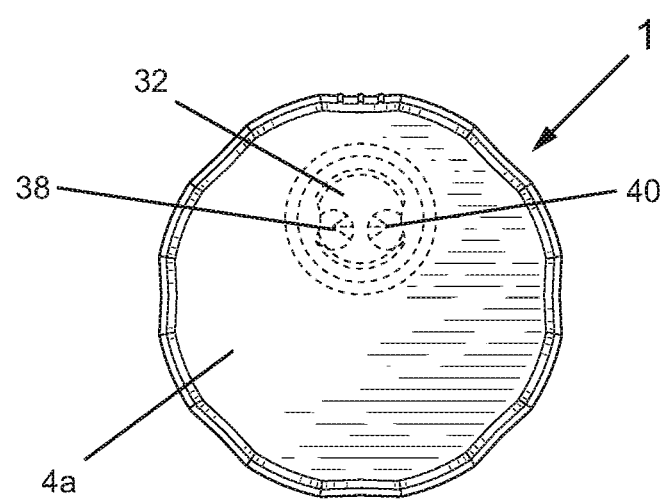
FIG. 7 is a bottom elevational view of the grinder apparatus of FIG. 1, in the assembled state.

FIG. 2 is a front elevational view of the grinder apparatus 1 of FIG. 1, in the assembled state. FIG. 3 is a rear elevational view of the container grinder apparatus 1 of FIG. 1, in the assembled state. FIG. 4 is a left side elevational view of the grinder apparatus 1 of FIG. 1, in the assembled state. FIG. 5 is a right side elevational view of the grinder apparatus 1 of FIG. 1, in the assembled state. FIG. 6 is a top elevational view of the grinder apparatus 1 of FIG. 1, in the assembled state. FIG. 7 is a bottom elevational view of the grinder apparatus 1 of FIG. 1, in the assembled state.

Figure 8:
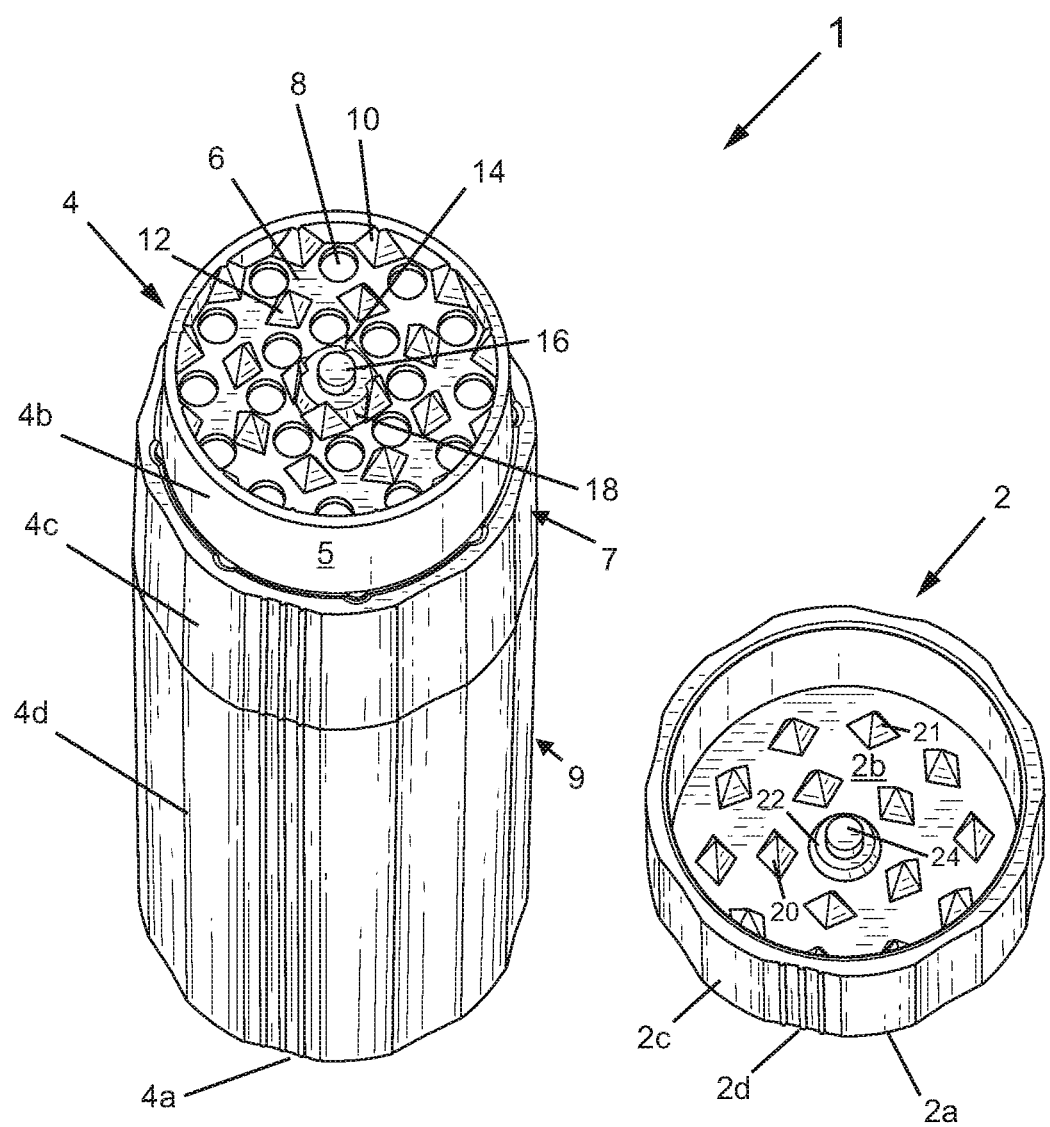
FIG. 8 is a front and top perspective view of a first part of the grinder apparatus of FIG. 1 and a bottom, and front perspective view of the second part of the grinder apparatus of FIG. 1, with the first part and the second part disconnected from each other.

FIG. 8 is a front and top perspective view of a first part 2 of the grinder apparatus 1 of FIG. 1 and a bottom, and front perspective view of the second part 4 of the grinder apparatus 1 of FIG. 1, with the first part 2 and the second part 4 disconnected from each other.

Figure 9:
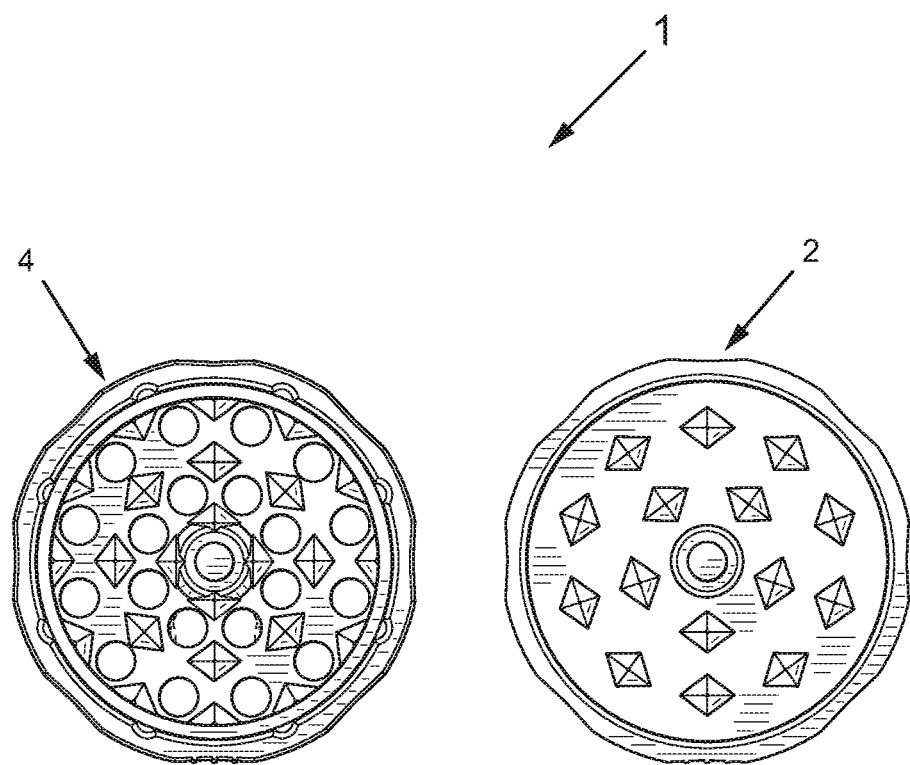
FIG. 9 is a top elevational view of the first part of the grinder apparatus of FIG. 1, and a bottom elevational view of the second part of the grinder apparatus of FIG. 1, with the first part and the second part disconnected from each other.

FIG. 9 is a top elevational view of the first part 2 of the grinder apparatus 1 of FIG. 1, and a bottom elevational view of the second part 4 of the grinder apparatus 1 of FIG. 1, with the first part 2 and the second part 4 disconnected from each other.

Figure 10:
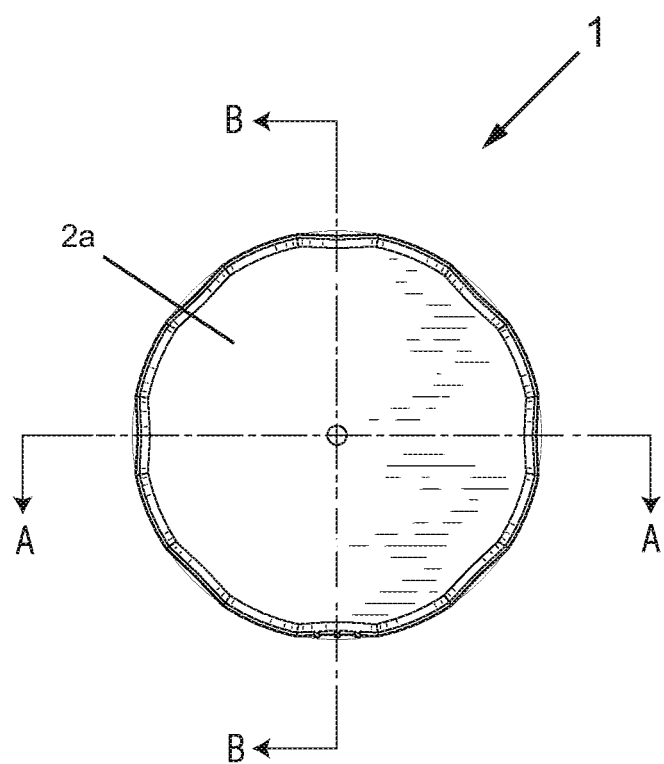
FIG. 10 is a top elevational view of the grinder apparatus of FIG. 1, in the assembled state, with lines AA and BB shown which are used for sectional views of FIG. 11 and FIG. 12, respectively.
Figure 11:
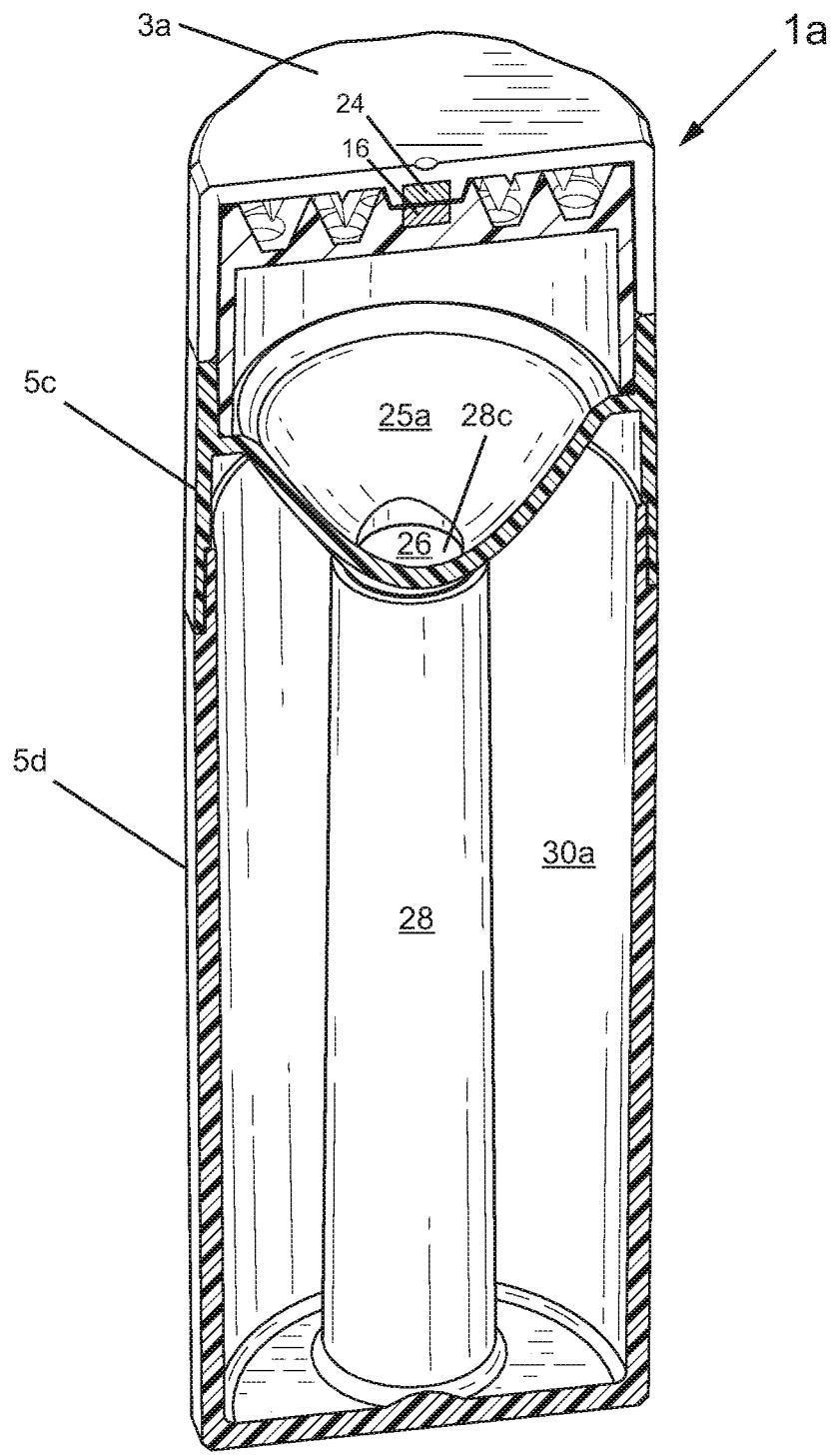
FIG. 11 is a sectional view of the grinder apparatus of FIG. 1, in the assembled state, along line AA.
Figure 12:
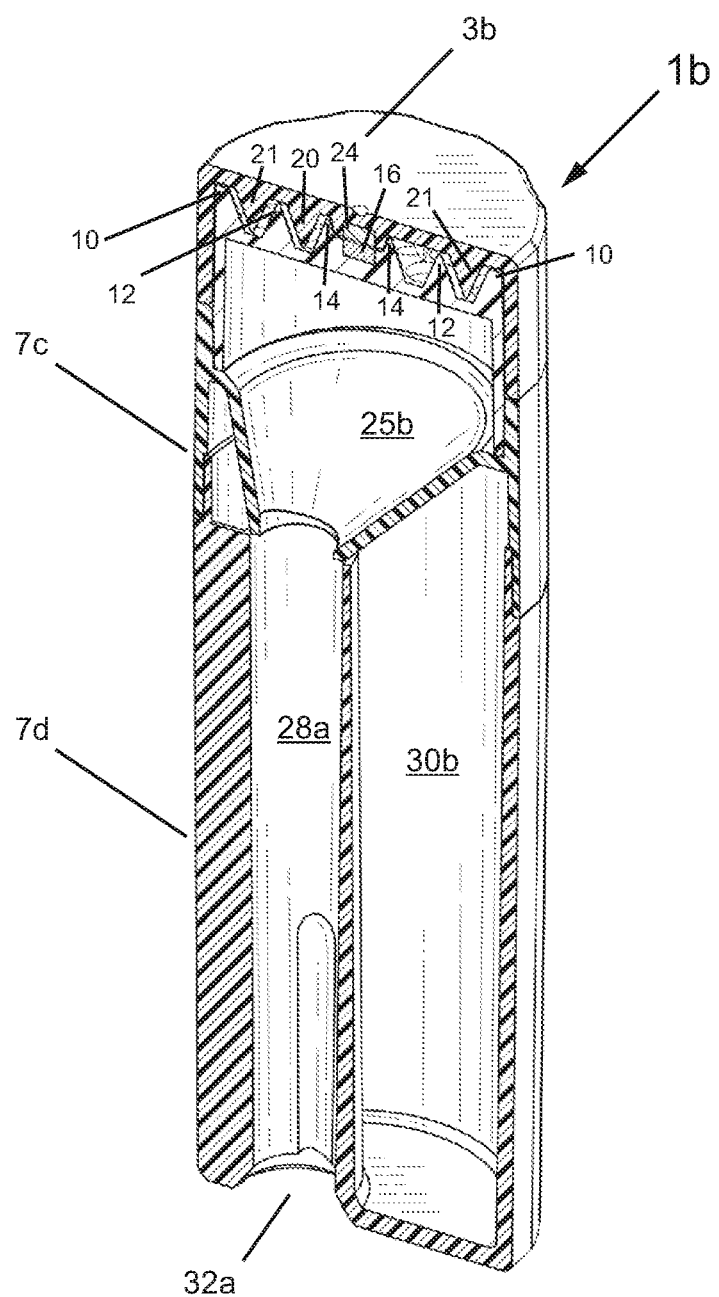
FIG. 12 is a first sectional view of the grinder apparatus of FIG. 1 in the assembled state, along line BB.

FIG. 10 is a top elevational view of the grinder apparatus 1 of FIG. 1, in the assembled state, with lines AA and BB shown which are used for sectional views of FIG. 11 and FIG. 12, respectively.

Figure 13:
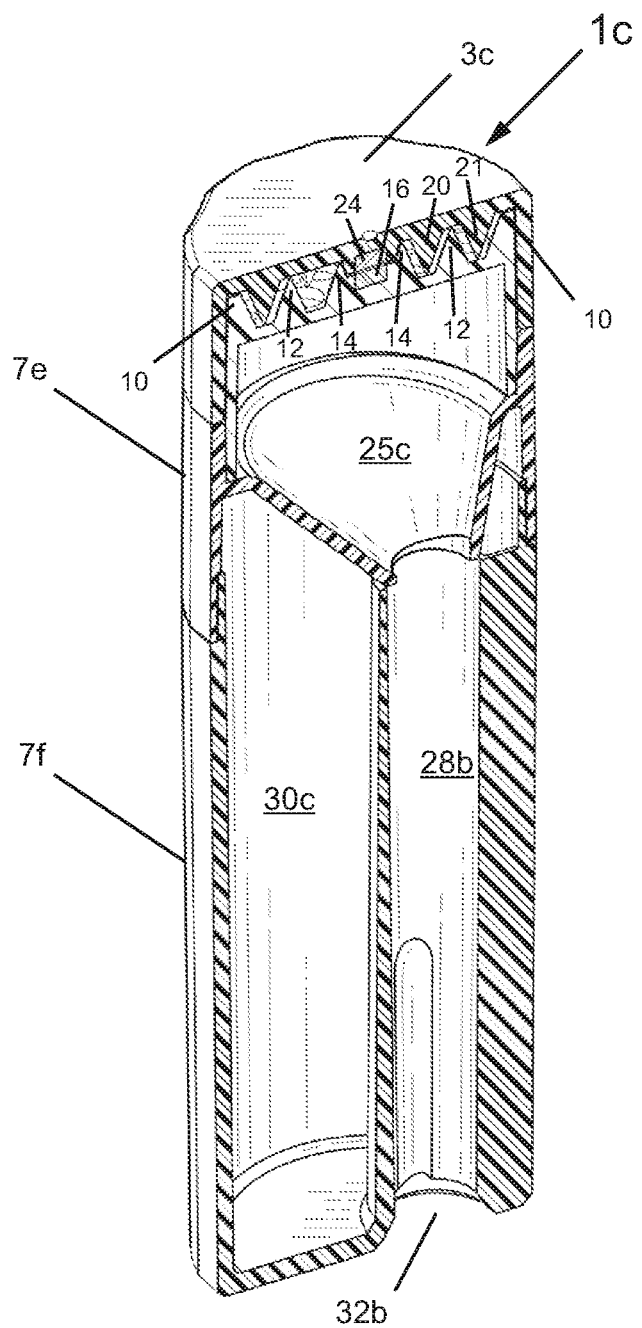
FIG. 13 is a second section view of the grinder apparatus of FIG. 1 in the assembled state, along line BB; which is a mirror image of the FIG. 12 view, such that putting the FIG. 12 and FIG. 13 views together forms the complete grinder apparatus of FIG. 1.

FIG. 11 is a sectional view of the grinder apparatus 1 of FIG. 1, in the assembled state, along line AA of FIG. 10. FIG. 12 is a first sectional view of the grinder apparatus 1 of FIG. 1 in the assembled state, along line BB of FIG. 10. FIG. 13 is a second sectional view of the grinder apparatus 1 of FIG. 1 in the assembled state, along line BB; which is a mirror image of the FIG. 12 view, such that putting the FIG. 12 and FIG. 13 views together forms the complete grinder apparatus 1 of FIG. 1.

The first part 2 of the grinder apparatus 1 includes a top or outer surface 2a shown in FIG. 1. The first part 2 includes an inner surface 2b shown in FIG. 8, opposite the top surface 2a. The first part 2 further includes an outer peripheral wall 2c, with ridges 2d.

There are a first plurality of pointed pyramid shaped protrusions 21, in an outer ring integrated with and fixed to the inner surface 2b, as shown in FIG. 8. In addition, there are a second plurality of pointed pyramid shape protrusions 20, integrated and fixed to the inner surface 2b, in an inner ring, within the outer ring of protrusions 21. At a center of the surface 2b and of the first part 2 is a circular protrusion 22, and a protruding magnet piece 24.

The second part 4 of the apparatus 1 includes a bottom surface 4a shown in FIG. 7, and a protruding circular wall 4b, a peripheral wall 4c, and a peripheral wall 4d, shown in FIG. 8.

The second part 4 also includes a top surface 6, having a plurality of openings 8, arranged in an outer and inner ring about a center of the top surface 6. The second part 4 further includes a plurality of sections 10, arranged in a ring, and shaped as half pyramids protruding inwards towards the center of the top surface 6 from the wall 4b The second part 4 further includes a plurality of pointed pyramid shaped sections 12, arranged in a ring, within the ring of sections 10, and between the two rings of the plurality of openings 8. The second part 4 further includes another ring of a plurality of point pyramid sections 14 attached to a central section 18 and between the second section 18 and the inner section of openings 8. The second part 4 further includes a magnetic piece 16 or metal piece, wherein magnetic piece or metal piece 16 of second part 4 is magnetically attracted to magnetic piece or metal piece 24 of first part 2.

The second part 4, further includes a funnel which includes portion 25b shown in FIG. 12, and a mirror portion 25c shown in FIG. 13. The second part 4 further includes an opening 26 from the funnel (includes portions 25b and 25c shown in FIGS. 12 and 13, respectively) and which leads to tube 28, shown in FIG. 11. The tube 28 has an exit opening 32 shown by dashed lines in FIG. 7, and which is formed by a combination of components or semicircular sections 32a and 32b shown in FIGS. 12 and 13, respectively.

The wall 4d of second part 4, includes portions 7d and 7f shown in FIGS. 12 and 13, respectively. The wall 4c of second part 4 includes portions 7c and 7e shown in FIGS. 12 and 13 respectively.

There is a hollow section which is formed by cavities or chambers 30b and 30c, shown in FIGS. 12 and 13, respectively.

In operation, referring to FIG. 8, an individual removes the first part 2, also called the grinder lid 2 from the second part 4. The individual then removes a grinder section 5, shown in FIG. 8, and which has a perimeter of wall 4b, from a funnel section 7, which has a perimeter of wall 4c and from a storage section 9, which has a perimeter of wall 4d. With the grinder lid 2 and the grinder section 5 removed, the funnel section 7 is disconnected from the storage section 9. Thereafter, in at least one embodiment, a rolled piece of paper or a cone of paper is inserted into tube 28, shown in FIG. 11, through an opening of tube 28, which will be nearest opening 26 of the funnel (includes portions 25b and 25c), when the funnel is oriented with respect to the tube 28 as shown by the combination of FIGS. 11-13.

With the rolled or cone shaped piece of paper in the tube 28, the funnel section 7 is connected to the storage section 9 as in FIGS. 1-5, so that the opening 26 of the funnel (includes portions 25b and 25c) is at the top of the entrance opening of the tube 28 as in FIGS. 11-13. Thereafter the grinder section 5 is connected to the combination of sections 7 and 9, as in FIG. 8.

Then an individual puts a material, such as preferably an herb, within the inner wall 4b, and on the components 6, 10, 12, 14, 16, and 18 of the second part 4, when second part 4 is separated from the first part 2, as in FIG. 8. The individual then connects the first part 2 to the second part 4 as shown by FIGS. 1-7, and 11-13, so that the magnetic and/or metallic pieces 24 and 16 are magnetically attached to each other as shown by FIGS. 11-13.

With the first part 2 magnetically attached to the second part 4, as in FIGS. 1-7 and 11-13, the first part 2 can be rotated with respect to the second part 4, and when this occurs, the ring of protrusions 21 move between the ring of protrusions 10 and the ring of protrusions 12; and the ring of protrusions 20 move between the ring of protrusions 12 and the ring of protrusions 14. Each of protrusions 21 has a pyramidal shape to snugly fit between the protrusions 10 and 12, and each of protrusions 20 has a pyramidal shape to snugly fit between the protrusions 12 and 14. The movement of the protrusions 21 and 20 of the first part 2 with respect to the protrusions 10, 12, and 14 of the second part 4, causes the material to be grinded into a powder or mulch which then passes through openings 8, into funnel (combination of 25b and 25c, in FIGS. 12 and 13, respectively), through bottom opening 26, into the rolled or cone shaped piece of paper within the tube 28 (combination of 28a and 28b).

After the rolled or cone shaped paper in the tube 28 has been filled with crushed, powdered and/or or mulched herbs, an individual may remove the first part or grinder lid 2 and the grinder 5 from the combination of sections 7 and 9. With the funnel section 7 and storage section 9 connected together (and disconnected from lid 2 and grinder 5), and individual may insert a stick through the opening 26 of the funnel and into the tube 28 to push and pack tightly the crushed, powdered and/or mulched herbs within the tube 28.

After the crushed, powdered, and/or mulched herbs have been tightly packed in the paper within the tube 28, the paper, with the herbs may be removed through an opening 32 shown by dashed lines in FIG. 7, which includes parts 32a and 32b shown in FIGS. 12 and 13 respectively.

Figure 14:
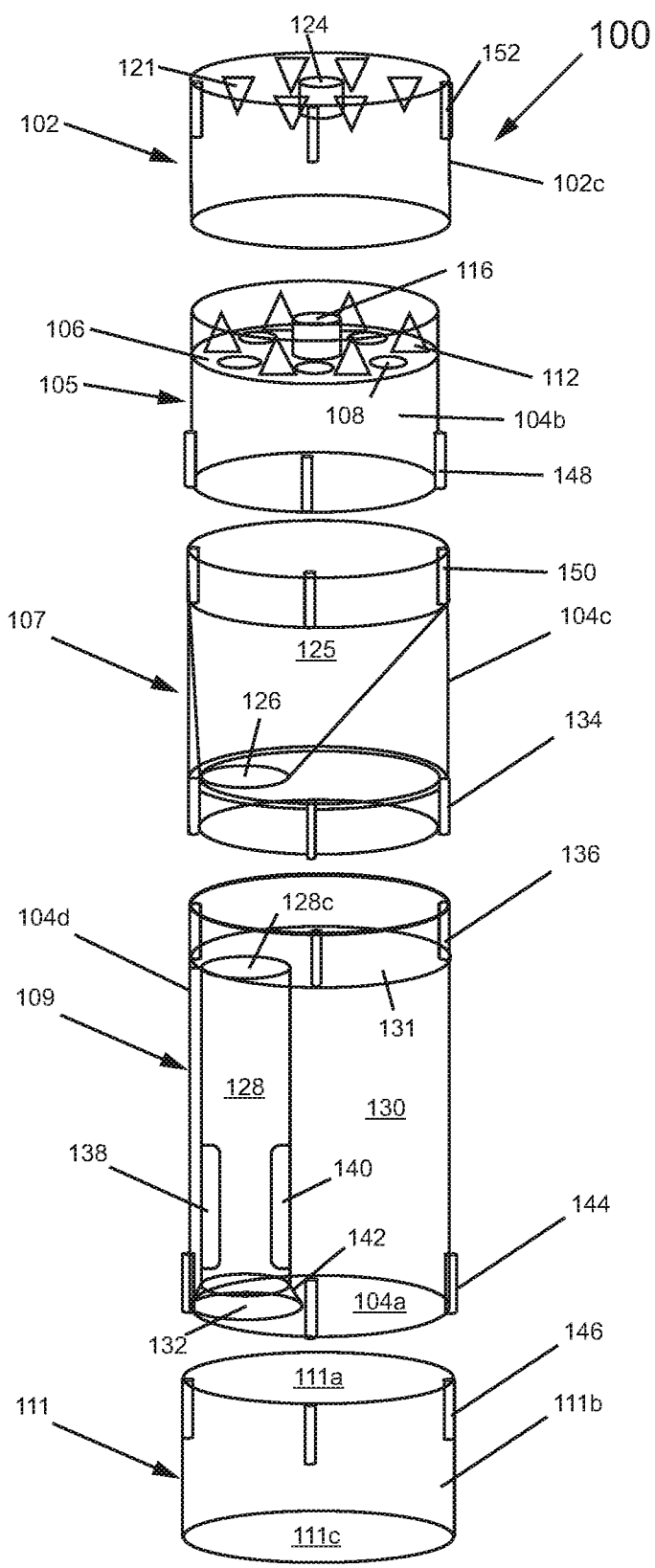
FIG. 14 is a simplified and/or wireframe perspective view of a grinder apparatus which may be substantially similar and/or identical to the grinder apparatus of FIG. 1, which is shown taken apart in FIG. 14, and which is provided for ease of description.
Figure 15:
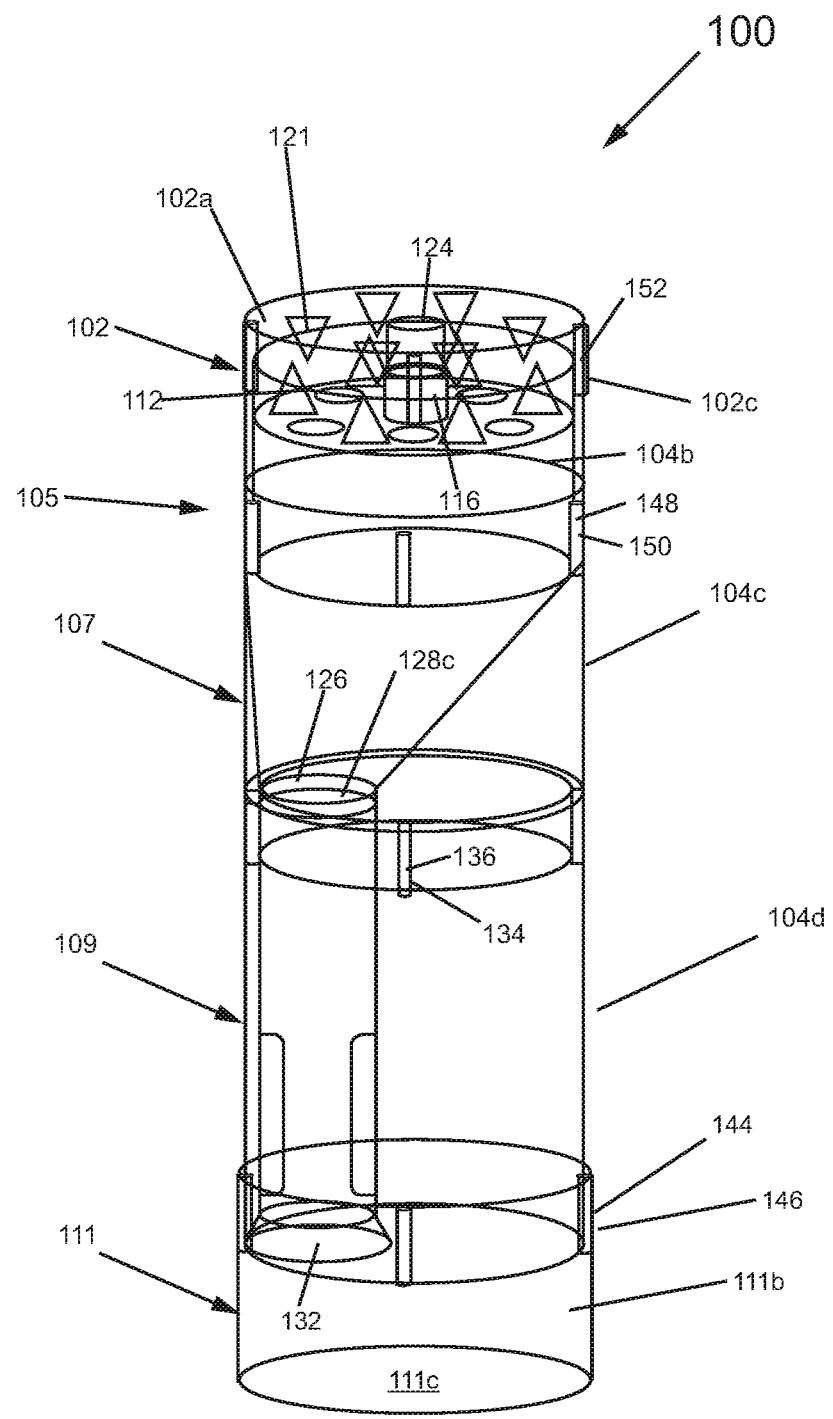
FIG. 15 is an assembled view of the simplified apparatus of FIG. 14.

FIG. 14 is a simplified and/or wireframe perspective view of a grinder apparatus 100 which may be substantially similar and/or identical to the grinder apparatus 1 of FIG. 1, which is shown taken apart in FIG. 14, and which is provided for ease of description. FIG. 15 is an assembled view of the simplified apparatus 100 of FIG. 14.

Figure 18:
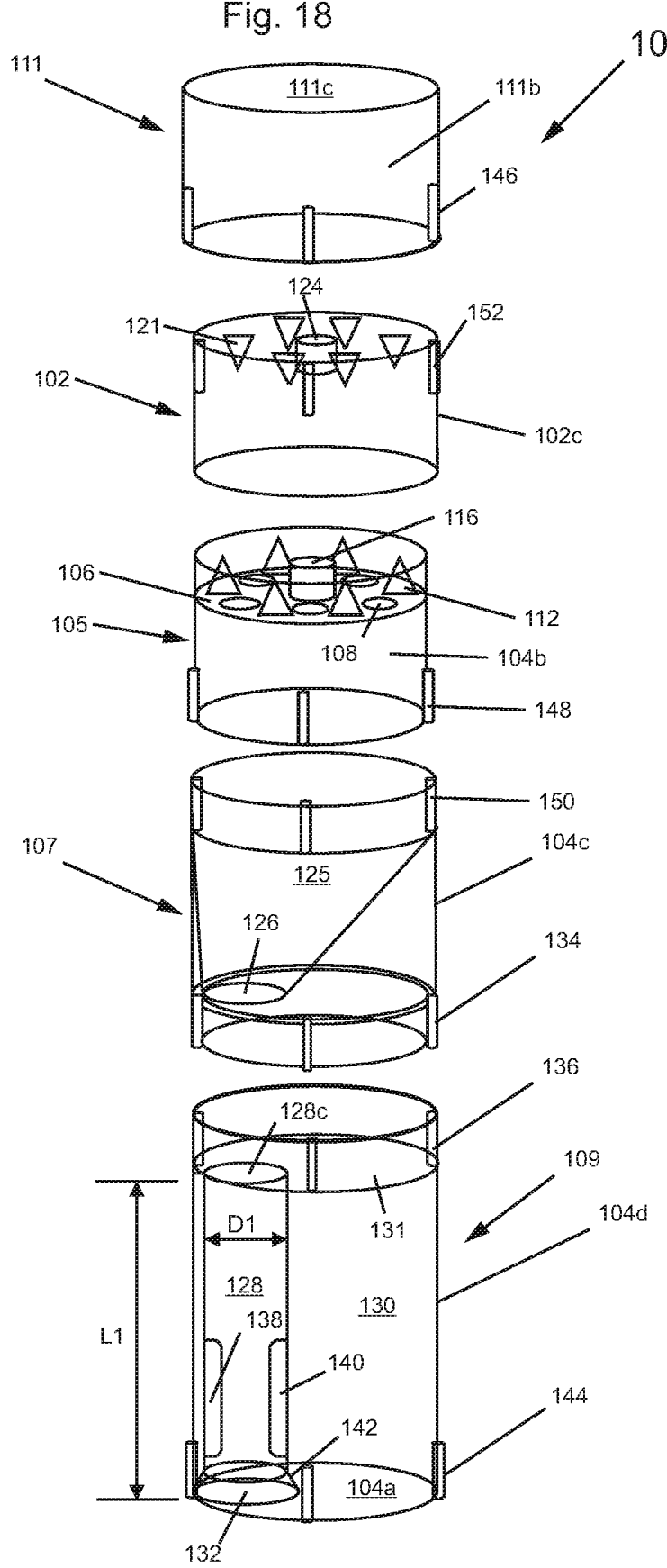
FIG. 18 shows the apparatus of FIG. 14, but with a component that is at the bottom of FIG. 14, flipped in FIG. 18, and shown at the top of the apparatus.

The apparatus 100 includes a grinder lid 102, a grinder 105, a funnel section 107, and a storage section 109, which are shown in simplified form in FIGS. 14-15 but which may be substantially similar and/or identical to the grinder lid 2, grinder 5, funnel section 7, and storage section 9, shown by the combination of FIGS. 1-13. The apparatus 100 also includes a section 111 which is shown at the bottom in FIGS. 14-15 and flipped and at the top in FIGS. 18-19.

The grinder lid 102 includes protrusions 121, and magnetic piece 124 which may be substantially similar and/or identical to the protrusions 21 and the magnetic piece 24, respectively. The grinder lid 2 includes peripheral wall 102c which may be substantially similar and/or identical to the wall 2c.

The grinder 105 includes protrusions 112, magnetic piece 116, openings 108, and surface 106, which may be substantially similar and/or identical to the protrusions 12 and magnetic piece 16, openings 8, and surface 6, respectively. The grinder 105 includes peripheral wall 104b which may be substantially similar and/or identical to the wall 4b.

The funnel section 107 includes funnel 125, having bottom opening 126, and a plurality of indentations or locking pieces 134, which may be substantially similar and/or identical to the funnel (combination of 25b and 25c, shown by combination of FIGS. 12-13), having the bottom opening 26, shown in FIG. 11, and a plurality of indentations or locking pieces, which may extend inward from wall portions 7c and/or 7e shown in FIGS. 12 and 13, respectively.

The storage section 109 includes a plurality of ridges, protrusions, or locking pieces 136 which are configured to mate with indentations 134 to lock the funnel section 107 into the storage section 109 so that section 107 cannot rotate with respect to section 109, and so that bottom opening 126 of the funnel 125 is aligned over and adjacent to opening 128c of the tube 128 in storage section 109. The storage section 9 may have similar or identical protrusions for mating with indentations of section 7, as the storage section 109.

The tube 128 of the storage section 109 may be similar or identical to the tube 28 of the storage section 9 of FIGS. 1-13. The tube 128 may include control arms 138 and 140 which are used to hold the pod in place throughout the packing process. The unique configuration of the tube 128 and the control arms 138 and 140 shown in FIGS. 14-15 allow the filled cone to be removed from the bottom opening 32 shown in FIG. 7. The tube 28, similarly or identically may include control arms 38 and 40, whose location is shown by dashed lines in FIG. 7.

The storage section 109 includes a storage chamber 130 shown in FIG. 13. The storage section 9 includes a storage chamber (combination of 30b and 30c, outside of tube 28), shown by combination of FIGS. 12 and 13, which may be similar or identical to the storage chamber 130.

The storage section 109 includes a sloped entry or exit 142, leading to opening 132, shown in FIG. 14. Similarly or identically, the storage section 9 includes a sloped entry or exit leading to opening 32 shown by dashed lines in FIG. 7.

When the apparatus 100 is assembled, as in FIG. 15, the wall 104b of the grinder 105 fits within the periphery of the wall 102c of the lid 102, the wall 104b of the grinder 105 fits within the wall 104c of the funnel section 107, and an indented top portion 131 of the wall 104d of the storage section fits within the wall 104c of the funnel section 107, so that locking devices 136 protrude outwards into recesses of locking devices 134, and opening 126 is aligned with opening 128c.

Apparatus 1 and/or apparatus 100, in at least one embodiment, are configured to be all-in-one portable products and each is configured to grind, pack, and store PODs with ease. The grinder lid 2 and/or 102, and the grinder 5 and/or 105 can be made of aluminum, titanium, polymer for better grinding and longer shelf life. The grinder 5 and/or 105 is designed to shred contents to specific size before allowing transfer to funnel 25, and/or 125, respectively.

Cavities or openings 8 and/or 108 allow ground contents of proper size to advance through floor or surfaces 6 and/or 106 of the grinder 5 and/or 105, to funnel sections 7 and/or 107, respectively.

In at least one embodiment, holding the apparatus 1 and/or 100 upside-down while grinding will result in finer consistency of ground content. Magnetic connection between pieces 24 and 16 and/or 124 and 116 allows quick filling of coarse content and prevents parts from getting lost.

Locking mechanisms 134 and 136 between funnel section 107 and base or storage section 109 ensures proper alignment and prevents erroneous assembly. The funnel section 107 acts as a stopper for POD in the filling chamber or tube 28 and/or 128 and prevents the funnel section 107 from moving up and out of place and cap for storage compartment.

The storage section 9 and/or 109 has a filling Chamber or tube 28 and/or 128, and a storage compartment (combination of 30*b* and 30*c*) and/or 130. The filling Chamber 28 and/or 128 has a sloped entry 142 located at base of cavity for tube 128 (for ease of insertion of POD), and the tube 128 is specifically designed to accommodate a large variety of PODs without the need for replacement parts.

Filling chamber or tube 28 and/or 128 has a cylindrical shape with a small angle narrowing toward the bottom, or opening 32 and/or 132 of base of cavity 128 and two control arms 138 and/or 140 located at base of cavity of tube 128. The control arms 138 and 140 act to hold POD in place to keep it from moving freely or falling out once inserted.

All parts can be made of stick-resistant high polished material to prevent ground content from sticking to device. In at least one embodiment, the transparent design of funnel section 7 and/or 107 and base or storage section 9 and/or 109 and generally all parts of the apparatus 1 and/or 100 allows patrons to see the entire process and eliminates the need to open unit mid-process.

Once the grinding process is complete, a pick can be used to assist in packing ground contents into POD, in the tubes 28 and/128 by tapping and pressing down into the funnel (combination of 25*b* and 25*c*) and/or funnel 125, and this pick can also be used to clean grinding apparatus 1 and/or 100 and the funnel (combination of 25*b* and 25*c*) and/or funnel 125 and generally parts 2, 5, 7, and 9 and/or parts 102, 105, 107, and 109. In addition, storage section 109 contains a storage compartment that could be used to hold the pick, coarse content, ground content, and/or PODs.

In at least one embodiment, the grinding teeth and/or protrusions 20 and 21 of the grinder lid 2 and/or grinding teeth and/or protrusions 121 of the grinder lid 102 have points which face downwards into the overall assembled apparatus 1 and/or 100.

In at least one embodiment, the grinding teeth and/or protrusions 12 of the grinder 5 and/or grinding teeth and/or protrusions 112 of the grinder 105 have points which face upwards towards the top of the assembled apparatus 1 and/or 100.

The grinder lid 2 and/or 102 mates with the grinder 5 and/or 105 respectively.

In at least one embodiment, it is critical that each of the openings 6 and/or 106 have a diameter of between two millimeters (mm) and five millimeters (mm).

The tube 28 or 128 may have two to four control arms, similar or identical to control arms 138 and 140 shown in FIG. 14.

It is critical in at least one embodiment, that the filling chamber or tube 28 and/or 128 have a cylinder shape with a small angle with respect to the closest part of the outer wall 104*d*, away from a center of the cylindrical shape or towards the center of the cylindrical shape between 0.2 degrees to 5.0 degrees to accommodate a large variety of PODs without the need for replacement parts. The filling chamber or tube 28 and/or tube 128 may have a length L1 shown in FIG. 18 which may be between 80.0 mm (millimeters) and 250.0 mm in length, and a diameter D1, shown in FIG. 18, which is between 8.0 mm to 20.0 mm, specifically designed to accommodate a large variety of PODs without the need for replacement parts.

FIGS. 14-19 are simplified transparent wireframe perspective views.

In at least one embodiment, the apparatus 100 includes a jar or bottom section 111 shown in FIG. 14. The jar section 111 may be cylindrical or substantially cylindrical and is open at its top 111*a*, has a peripheral wall 111*b*, and a bottom solid surface 111*c*. The jar or bottom section 111 also has indentations, recesses or locking devices 146 which are configured to mate with protrusions or locking devices 144 of section 109. The apparatus 100 may be assembled with the bottom section 111 as shown in FIG. 15, so that the locking devices 144 are within and mate with the locking devices 146 to keep the section 109 from rotating with respect to the section 111. The apparatus 100 as shown in FIG. 15 is thus substantially or entirely air tight having a bottom solid surface 111*c*, a top solid surface 102*a*, and peripheral walls 102*c*, 104*c*, 104*d*, and 111*b*. The assembled configuration for apparatus 100 shown in FIG. 15, retains particles escaping from the bottom 132 in the bottom or jar section 111, within the peripheral wall 111*b* and/or on the bottom surface 111*c*.

The jar or bottom section 111 may be removed from the rest of the apparatus 100 to permit a cone or rolled piece of paper with ground or grinded material to be slid out of the tube 128, out of opening 132.

A similar or identical jar section 111 may be used with the apparatus 1.

Figure 16:
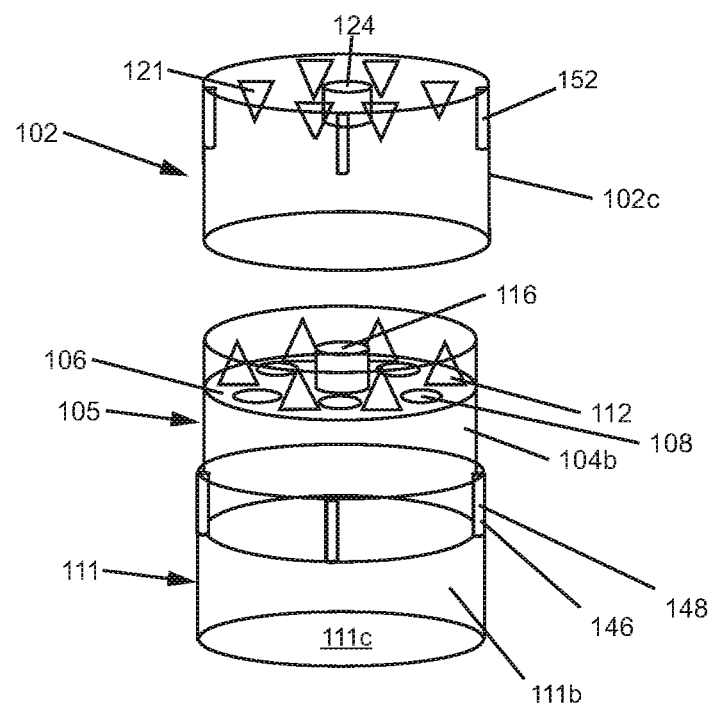
FIG. 16 is a simplified and/or wireframe perspective view of some of the components of the grinder apparatus of FIG. 14, wherein two of these components are shown assembled together.
Figure 17:
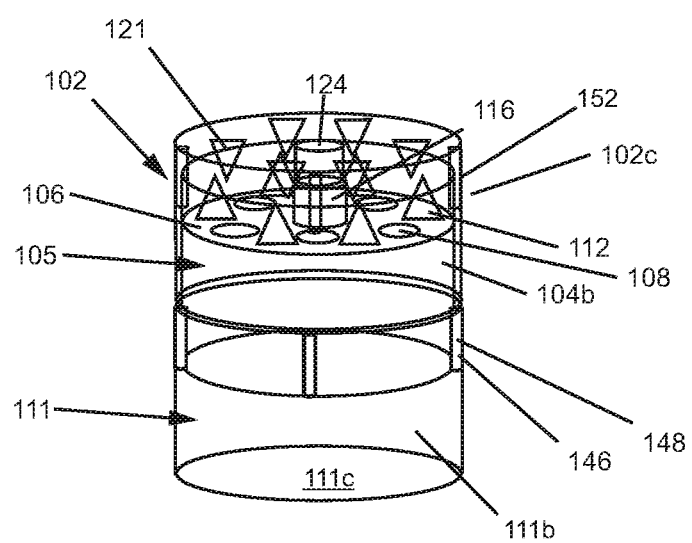
FIG. 17 shows the components shown in FIG. 16, with all three components assembled together.

In at least one embodiment, the jar section 111 may also be configured to be connected and locked in orientation, to the grinder section 105 as shown in FIGS. 16-17. A plurality of indentations or recesses 146 of the jar section 111 and a plurality of protrusions 148 of the grinder section 105 may be configured to mate and lock together as shown in FIG. 16. The grinder lid 102 may then be placed on the grinder section 105 as shown in FIG. 17, so that the magnetic piece 124 is magnetically connected to the magnetic piece 116. The configuration shown in FIG. 17 provides an overall simple grinder apparatus without the elongated tube 128. Material may be ground or grinded and then will fall through openings 108, through opening 111*a* and onto surface 111*c* and/or within peripheral wall 111*b*.

Figure 19:
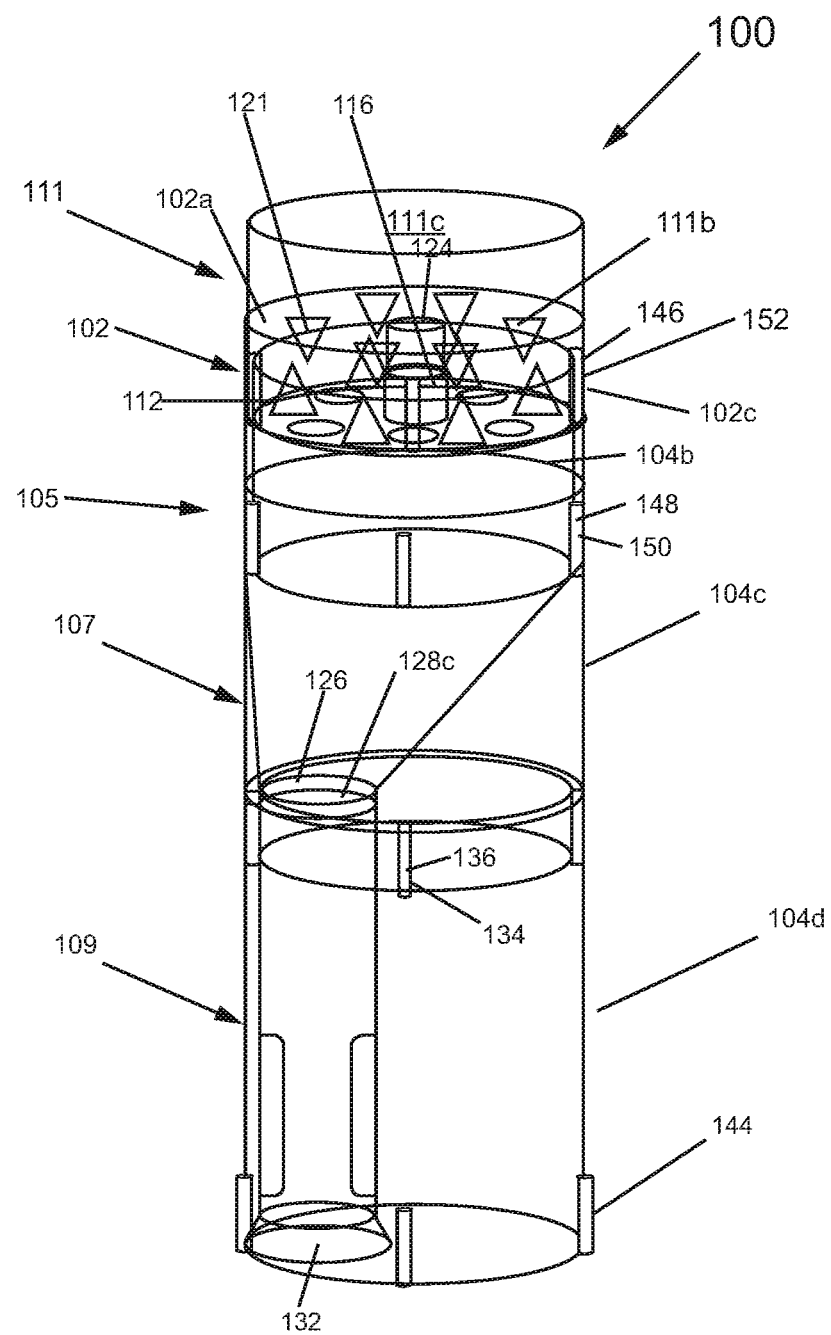
FIG. 19 shows the apparatus of FIG. 14 assembled, but with the order as shown in FIG. 18.

In at least one embodiment, the section 111 may be attached to the grinder lid 102 as shown by FIG. 19. The section 111 may include inward facing indentations, recesses, or locking devices 146, shown in FIG. 18, which mate with protrusions 152 of the grinding lid 2, as shown by FIG. 19, to hold the section 111 in a fixed orientation with respect to the grinding lid 102. The section 111 in the configuration of FIG. 19, provides an additional gripping area for rotating the grinding lid 102 with respect to the grinding section 105, particularly for individuals with arthritic hands and/or lacking in hand strength as it provides extra hold, grip, and/or leverage on the grinding lid 102.

Having the section 111 and the rest of the apparatus 100 configured so that section 111 may be attached at the bottom as in FIG. 15 or at the top as in FIG. 19, also helps to prevent the section 111 from becoming lost.

In at least one embodiment, the elongated tube 28 and/or 128 with extrusions, such as 138 and 140 allows a multitude of PODs without the need for replacement parts.

In at least one embodiment, it is critical that the entire apparatus 1 and/or 100 be transparent to allow control of a complete process.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus comprising
a grinder lid section;
a grinder section configured to be attached to and detached from the grinder lid section, so that when the grinder section is attached to the grinder lid section the grinder lid section rotates with respect to the grinder section;
a funnel section configured to be attached to and detached from the grinder section, so that when the funnel section is attached to the grinder section the funnel section does not rotate with respect to the grinder section;
and a storage section configured to be attached and detached from the funnel section, so that when the storage section is attached to the funnel section the storage section does not rotate with respect to the funnel section; and
wherein the funnel section has a top opening and a bottom opening;
wherein the funnel section has a funnel with a top opening and a bottom opening;
wherein the storage section has a top opening;
wherein the storage section has a tube with a top opening;
wherein the storage section is configured to be removably attached to the funnel section so that the bottom opening of the funnel of the funnel section is in alignment with the top opening of the tube of the storage section; and
wherein the tube is off-center with respect to a peripheral wall of the storage section.

2. The apparatus of claim 1 wherein
the grinder lid section has a plurality of pointed teeth which face towards the grinder section when the grinder lid section is attached to the grinder section;
and the grinder section has a plurality of pointed teeth which face towards the grinder lid section when the grinder lid section is attached to the grinder section.

3. The apparatus of claim 1 wherein
the funnel funnels material entering the top opening of the funnel towards a first side of a peripheral wall of the funnel section and away from a second side of the peripheral wall of the funnel section, which is opposite the first side of the peripheral wall of the funnel section, and out a bottom opening of the funnel; and
wherein the funnel section is adapted to be attached to the storage section to cause material to escape from the bottom opening of the funnel into the top opening of the tube of the storage section.

4. The apparatus of claim 3 wherein
the grinder section has a plurality of openings and wherein when the grinder section is attached to the funnel section and when a plurality of particles falls through the plurality of openings, the plurality of particles falls into the top opening of the funnel.

5. The apparatus of claim 1 wherein
the grinder section and the grinder lid section attach together by magnetic attraction.

6. The apparatus of claim 1 wherein
the funnel section has a locking mechanism;
wherein the storage section has a locking mechanism;
and wherein the locking mechanism of the funnel section and the storage section interact to prevent rotation of the storage section with respect to the funnel section.

7. The apparatus of claim 1 wherein
the tube of the storage section includes a pair of control arms for holding a pod in place during a packing process.

8. The apparatus of claim 1 wherein
the storage section includes a storage chamber outside of the tube of the storage section;
wherein the peripheral wall of the storage section surrounds both the storage chamber and the tube;
wherein the tube has a diameter and a length;
wherein the storage chamber has a width and a length;
wherein the width of the storage chamber is greater than the diameter of the tube, and the length of the storage chamber overlaps the length of the tube; and
wherein the width of the storage chamber spans from one side of the peripheral wall of the storage section to an opposing side of the peripheral wall of the storage section.

9. An apparatus comprising
a grinder lid section having a top and a bottom;
a grinder section configured to be attached to and detached from the bottom of the grinder lid section, so that when the grinder section is attached to the grinder lid section the grinder lid section rotates with respect to the grinder section;
a funnel section configured to be attached to and detached from the grinder section, so that when the funnel section is attached to the grinder section the funnel section does not rotate with respect to the grinder section;
and a storage section, having a top and a bottom, wherein the top of the storage section is configured to be attached and detached from the funnel section, so that when the top of the storage section is attached to the funnel section the storage section does not rotate with respect to the funnel section;
a jar section having a top with an opening, a peripheral wall, and a bottom solid surface; and
wherein the top of the jar section is configured to attach to either the top of the grinder lid section or the bottom of the storage section, so that the jar section does not rotate with respect to the grinder lid section when the top of the jar section is attached to the top of the grinder lid section and the jar section does not rotate with respect to the storage section when the top of the jar section is attached to the bottom of the storage section;
wherein the top of the jar section is configured to attach directly to a bottom of the grinder section, when a top of the grinder section is attached to the bottom of the grinder lid section, so that the jar section, the grinder section and the grinder lid section, together make up a grinder for grinding coarse material into ground material.

10. A method comprising:
grinding coarse content material into ground content material by rotating a grinder lid section while the grinder lid section is connected to a grinder section;
wherein grinder section is configured to be attached to and detached from a funnel section, so that when the funnel section is attached to the grinder section the funnel section does not rotate with respect to the grinder section; and
wherein the funnel section is configured to be attached and detached from a storage section, so that when the storage section is attached to the funnel section the storage section does not rotate with respect to the funnel section;
wherein the funnel section has a top opening and a bottom opening;
wherein the funnel section has a funnel with a top opening and a bottom opening;
wherein the storage section has a top opening;
wherein the storage section has a tube with a top opening;
wherein the storage section is configured to be removably attached to the funnel section so that the bottom opening of the funnel of the funnel section is in alignment with the top opening of the tube of the storage section; and
wherein the tube is off-center with respect to a peripheral wall of the storage section.

11. The method of claim 10 wherein
the grinder lid section has a plurality of pointed teeth which face towards the grinder section when the grinder lid section is attached to the grinder section; and
the grinder section has a plurality of pointed teeth which face towards the grinder lid section when the grinder lid section is attached to the grinder section.

12. The method of claim 10 wherein
the funnel funnels material entering the top opening of the funnel towards a first side of a peripheral wall of the funnel section and away from a second side of the peripheral wall of the funnel section, which is opposite the first side of the peripheral wall of the funnel section, and out a bottom opening of the funnel; and
wherein the funnel section is adapted to be attached to the storage section to cause material to escape from the bottom opening of the funnel into the top opening of the tube of the storage section.

13. The method of claim 12 wherein
the grinder section has a plurality of openings and wherein when the grinder section is attached to the funnel section and when a plurality of particles falls through the plurality of openings, the plurality of particles falls into the top opening of the funnel.

14. The method of claim 12 further comprising
causing ground content material in rolling paper in the tube to exit the tube through the bottom opening opposite the top opening of the tube, along with the rolling paper, while the ground content material is in the rolling paper.

15. The method of claim 10 wherein
a top of a jar section having a top with an opening, a peripheral wall, and a bottom solid surface, is configured to attach to either a top of the grinder lid section or a bottom of the storage section opposite the top opening of the storage section, so that the jar section does not rotate with respect to the grinder lid section when the top of the jar section is attached to the top of the grinder lid section and the jar section does not rotate with respect to the storage section when the top of the jar section is attached to the bottom of the storage section.

16. The method of claim 15 wherein
the top of the jar section is configured to attach directly to a bottom of the grinder section, when a top of the grinder section is attached to a bottom of the grinder lid section, so that the jar section, the grinder section and the grinder lid section, together make up a grinder for grinding coarse material into ground material.

17. The method of claim 10 wherein
the grinder section and the grinder lid section attach together by magnetic attraction.

18. The method of claim 10 wherein
the storage section has rolled paper inserted therein into which the ground content material is packed.

19. The method of claim 10 wherein
the funnel section has a locking mechanism;
wherein the storage section has a locking mechanism;
and wherein the locking mechanism of the funnel section and the storage section interact to prevent rotation of the storage section with respect to the funnel section.

20. The method of claim 10 wherein
the tube of the storage section includes a pair of control arms for holding a pod in place during a packing process.

* * * * *